US009229586B2

(12) United States Patent
Ling et al.

(10) Patent No.: US 9,229,586 B2
(45) Date of Patent: Jan. 5, 2016

(54) TOUCH SYSTEM AND METHOD FOR DETERMINING THE DISTANCE BETWEEN A POINTER AND A SURFACE

(71) Applicant: CANON KABUSHIKI KAISHA, Tokyo (JP)

(72) Inventors: Richard Ling, Manly (AU); Ben Yip, Ryde (NZ); Bin Liao, Beecroft (AU); Cameron Murray Edwards, Clovelly (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/322,807

(22) Filed: Jul. 2, 2014

(65) Prior Publication Data

US 2015/0009183 A1 Jan. 8, 2015

(30) Foreign Application Priority Data

Jul. 4, 2013 (AU) .................................. 2013206695

(51) Int. Cl.
*G06F 3/042* (2006.01)
(52) U.S. Cl.
CPC .................................... *G06F 3/0425* (2013.01)
(58) Field of Classification Search
CPC ........................................ G06F 3/0425–3/0426
USPC .......................................... 345/168–172, 175
See application file for complete search history.

(56) References Cited

U.S. PATENT DOCUMENTS 6,947,032 B2    9/2005   Morrison et al.
7,050,177 B2    5/2006   Tomasi et al.

FOREIGN PATENT DOCUMENTS

EP          0554492 B1     8/1995

OTHER PUBLICATIONS

Wilson, Andrew D., "PlayAnywhere: A Compact Interactive Tabletop Projection-Vision System", UIST '05 Proceedings of the 18th annual ACM symposium on User interface software and technology, Proceedings from 2005 ACM Symposium on User Interface Software and Technology, Santa Fe, NM, USA , Oct. 2005; ACM: New York, NY, USA, Oct. 2005; pp. 83-92.
Iizuka, Keigo, "Divergence-Ratio Axi-Vision Camera (Divcam): a distance mapping camera", Antennas and Propagation Society International Symposium, 2007 IEEE Jun. 2007, pp. 3984-3987.

*Primary Examiner* — Michael Pervan
(74) *Attorney, Agent, or Firm* — Canon USA Inc. IP Division

(57) ABSTRACT

A method for determining the distance from a tip of a pointer to a surface using a light source and a single camera, the method comprising detecting in an image captured by the camera a tip of the pointer, determining in the image captured by the camera the intensity of a set of pixels below the tip of the pointer, the intensity defining a reflection by the surface of the tip of the pointer illuminated by the light source, and determining the distance from the tip of the pointer to the surface depending upon the intensity of the set of pixels below the tip of the pointer and an intensity of pixels of the tip of the pointer in the image.

11 Claims, 14 Drawing Sheets

TOUCH SYSTEM AND METHOD FOR DETERMINING THE DISTANCE BETWEEN A POINTER AND A SURFACE

REFERENCE TO RELATED PATENT APPLICATION(S)

This application claims the benefit under 35 U.S.C. §119 of the filing date of Australian Patent Application No 2013206695, filed 4 Jul. 2013, hereby incorporated by reference in its entirety as if fully set forth herein.

TECHNICAL FIELD

The current invention relates to touch detection systems, and in particular to a system and method for determining the distance between a pointer and a surface.

BACKGROUND

Touchscreens are becoming increasingly common as user interfaces in many electronic devices such as mobile phones, tablets and portable computers. One current touchscreen technology comprises a transparent electronic touch sensitive layer which is overlaid on a rigid electronic display panel and which can directly sense the touch of a physical pointer such as a finger or stylus.

A touchscreen can support richer user interaction if it can sense the presence of a physical pointer that is close to, but not actually in contact with, the touchscreen. Such interaction may include detecting a so-called "hover" state of the pointer, as described below. In order to do so, however, and because the pointer is not in contact with an electronic sensing layer, the system must incorporate additional sensors able to remotely detect the pointer. Various parties have designed and built such non-conventional touchscreen systems, referred to hereinafter as augmented touchscreen systems.

One current augmented touchscreen system comprises a camera having a field of view looking generally across a surface, where the images from the camera are analysed to detect a pointer and the pointer's reflection in the surface. Such systems require that the surface be sufficiently reflective to allow the pointer's reflection to be detected by the camera. If the pointer and its reflection meet in the image, the pointer is deemed to be touching the surface. If there is a gap between the pointer and its reflection captured in the image, the pointer is deemed to be close to, but not touching, the surface, and this is interpreted as the "hover" state.

SUMMARY

It is an object of the present invention to substantially overcome, or at least ameliorate, one or more disadvantages of existing arrangements.

Disclosed are arrangements, referred to as Brightness Based Height Determination (BBHD) arrangements, which seek to address the above problems by determining, in an image of a pointer and a projection surface illuminated by a single light source and captured by a single camera, the brightness of the pointer and of a reflected image thereof in the surface, and comparing a combination of the aforementioned brightness measures against a pre-calibrated set of data to determine the height of the pointer above the surface.

According to a first aspect of the present invention, there is provided a method for determining a distance from a tip of a pointer to a surface using a light source and a single camera, the method comprising:

detecting in an image captured by the camera a tip of the pointer;

determining in the image captured by the camera an intensity of a set of pixels below the tip of the pointer, the intensity defining a reflection by the surface of the tip of the pointer illuminated by the light source; and determining the distance from the tip of the pointer to the surface depending upon the intensity of the set of pixels below the tip of the pointer and an intensity of pixels of the tip of the pointer in the image.

According to another aspect of the present invention, there is provided a method for determining a distance from a tip of a pointer to a surface using a light source and a single camera, the method comprising the steps of:

illuminating the pointer and the surface by the light source;
capturing an image by the camera;
detecting in the image a tip of the pointer;
determining in the image an intensity of a set of pixels below the tip of the pointer;
determining the distance from the tip of the pointer to the surface dependent upon the intensity of the set of pixels below the tip of the pointer, and an intensity of pixels of the tip of the pointer.

According to another aspect of the present invention, there is provided an apparatus for implementing any one of the aforementioned methods.

According to another aspect of the present invention, there is provided a computer program product including a computer readable medium having recorded thereon a computer program for implementing any one of the methods described above. Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
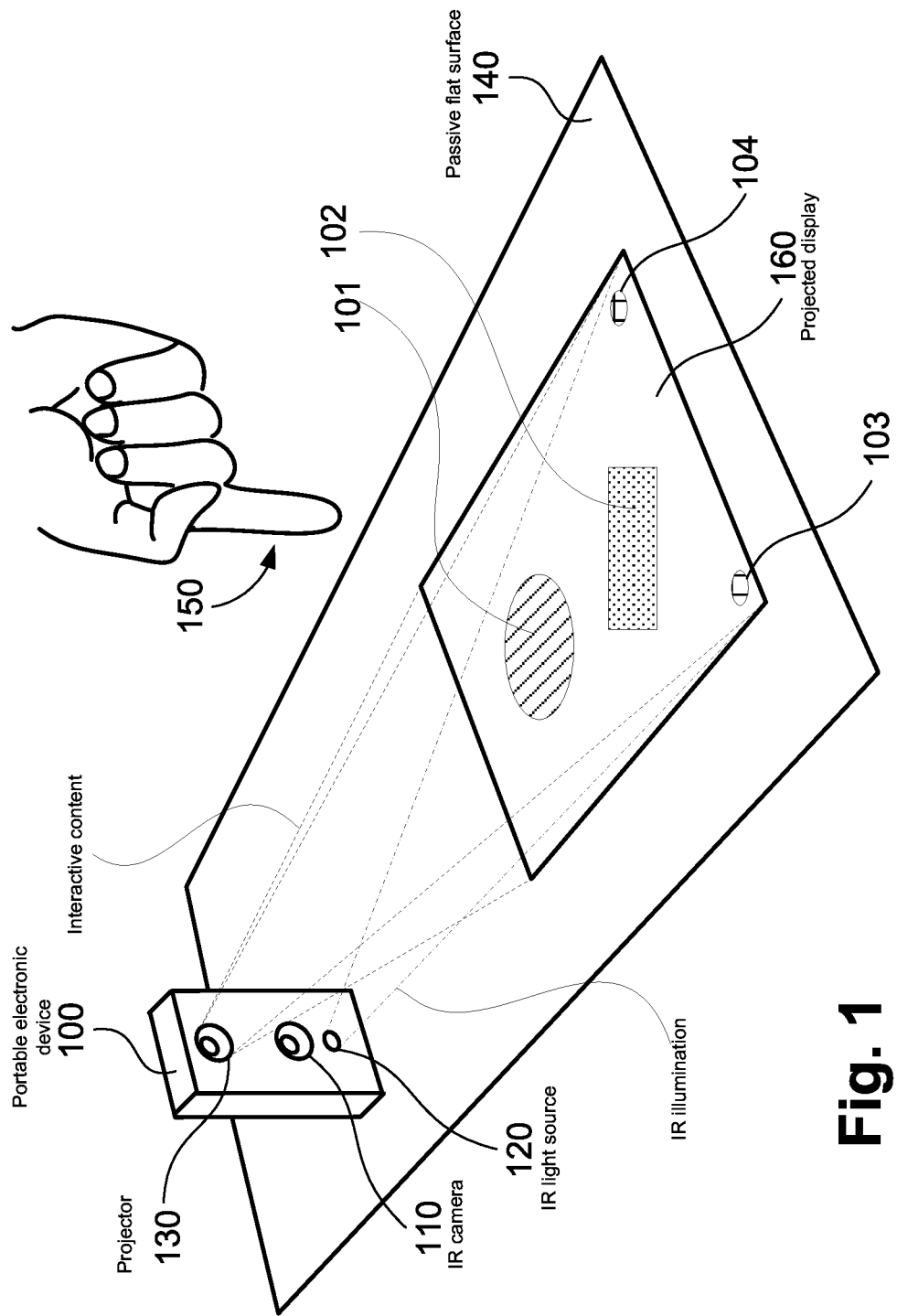
FIG. 1 is a preferred BBHD arrangement of a touch system according to the present BBHD arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of arrangements which may form public knowledge through their use. Such should not be interpreted as a representation by the present inventor(s) or the patent applicant that such documents or devices in any way form part of the common general knowledge in the art.

The present BBHD arrangements relate to a touch system and method able to determine the distance between a pointer (such as a finger or stylus) and a surface, described hereinafter in more detail with reference to FIG. 1. The terms finger and pointer (and the terms finger-tip and pointer-tip) are used interchangeably, unless otherwise specified. The system includes a surface, a camera having a field of view looking generally across the surface, a source of illumination, and a processor. The camera captures images of a pointer lit by the source of illumination. The processor processes the images to detect both the pointer and the pointer's reflection in the surface. The processor measures the brightness of the image areas within which the pointer and the pointer's reflection are located. Based on these brightnesses, the processor determines a distance between the pointer and the surface.

FIG. 1 shows a preferred BBHD arrangement. In this BBHD arrangement, a portable electronic apparatus 100 contains a projector 130, an infrared camera 110, an infrared light source 120, and a processor 240 (see FIG. 2). The device 100 rests on a passive, flat surface 140, for example a table or a desk. The projector 130 projects interactive content 101 (for example, World Wide Web content, photo albums, video content), and optionally status and control information 102 for the device 100, onto the surface 140, forming a projected display 160. The infrared light source 120 illuminates the region around and above the projected display 160 with infrared light that is invisible to a user. The infrared camera 110 captures images of the region around and above the projected display 160. The user uses his or her finger 150 as a pointer to interact with the interactive content shown on the projected display 160. Other similarly-shaped objects, such as a stylus, pen, or pencil, can also be used as a pointer.

The frequency of light emitted by infrared light source 120 is chosen to be distinguishable from frequencies of light in the surrounding environment. If a projector 130 is present, the frequency of light is chosen to be different from frequencies of light emitted by the projector 130. The infrared camera 110 includes a filter that is matched to the frequency of light emitted by infrared light source 120. The filter ensures that the infrared camera 110 is substantially sensitive only to the frequency of light emitted by the infrared light source 120. The infrared camera 110 produces a grayscale image of content in its field of view in which pixel brightness corresponds to the brightness of infrared light received.

The surface 140 must be sufficiently reflective so that a reflection 420 (see FIG. 4) of the pointer 150 in the surface 140 is detectable by infrared camera 110 with a sufficient signal to noise ratio (SNR). Additionally, the reflectivity of the surface 140, the intensity of the infrared light source 120, and the sensitivity of the infrared camera 110 must, in combination, enable the infrared camera 110 to sense an incremental change in brightness of the image 420' of the pointer's reflection 420 in the surface 140 caused by a change in proximity of the finger 150 relative to the surface 140. If a projector 130 is present, the surface 140 must also permit the user to clearly see the projected display 160. For example, a white surface allows high contrast viewing of the projected display 160.

Figure 2:
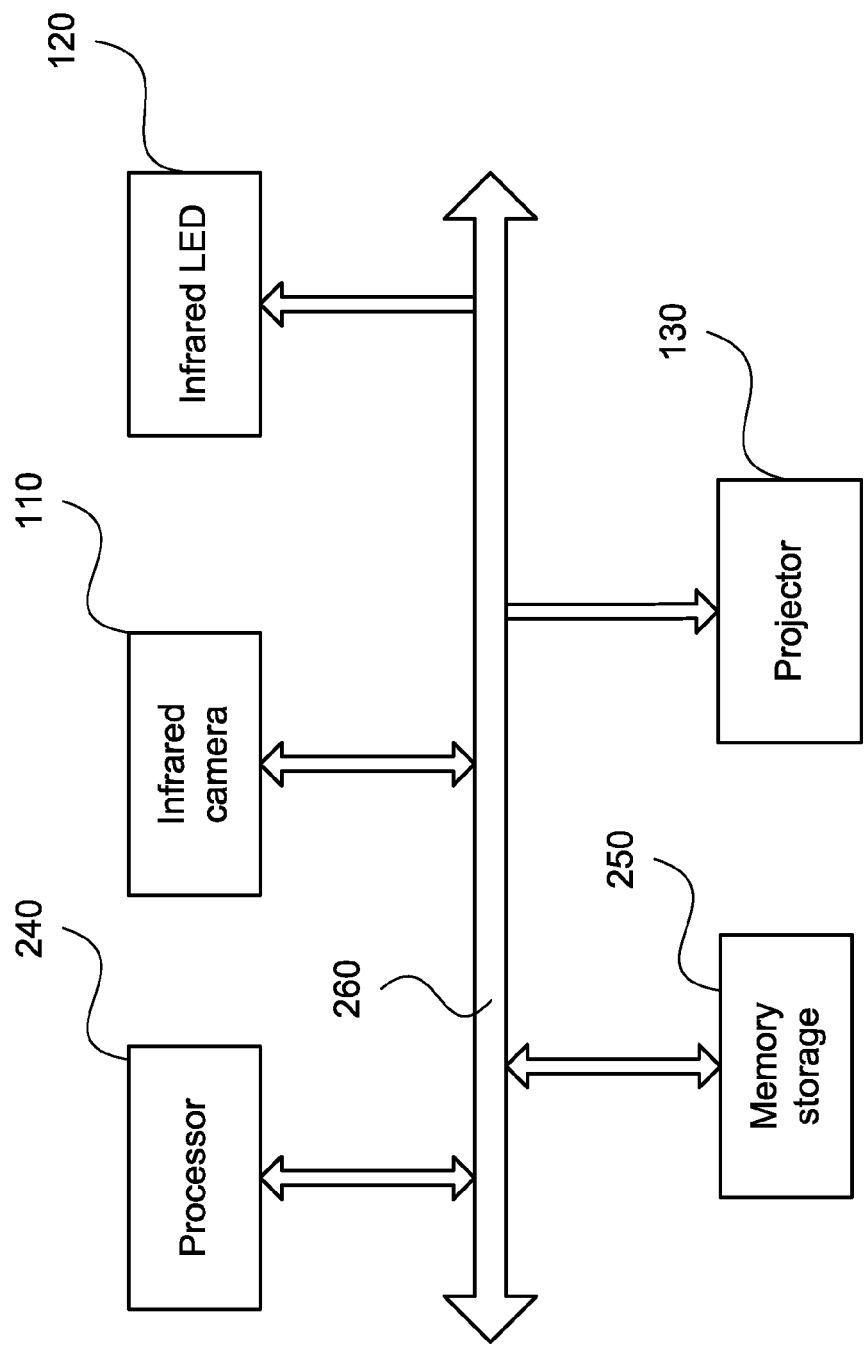
FIG. 2 is a system architecture diagram of a device according to the preferred BBHD arrangement.

FIG. 2 is a top level system architecture diagram of the device 100. This architecture is described in further detail with reference to FIGS. 10A and 10B. Returning to FIG. 2, the components of the device 100 are connected by a system bus 260. The processor 240 reads and executes instructions from a BBHD software application 133 stored in the memory storage module 250, and controls the infrared camera 110, infrared light source 120 and projector 130. The memory storage 250 stores data including instructions for the processor 240, images captured by the infrared camera 110, calibration data, and the interactive content for display by the projector 130.

Figure 10A:
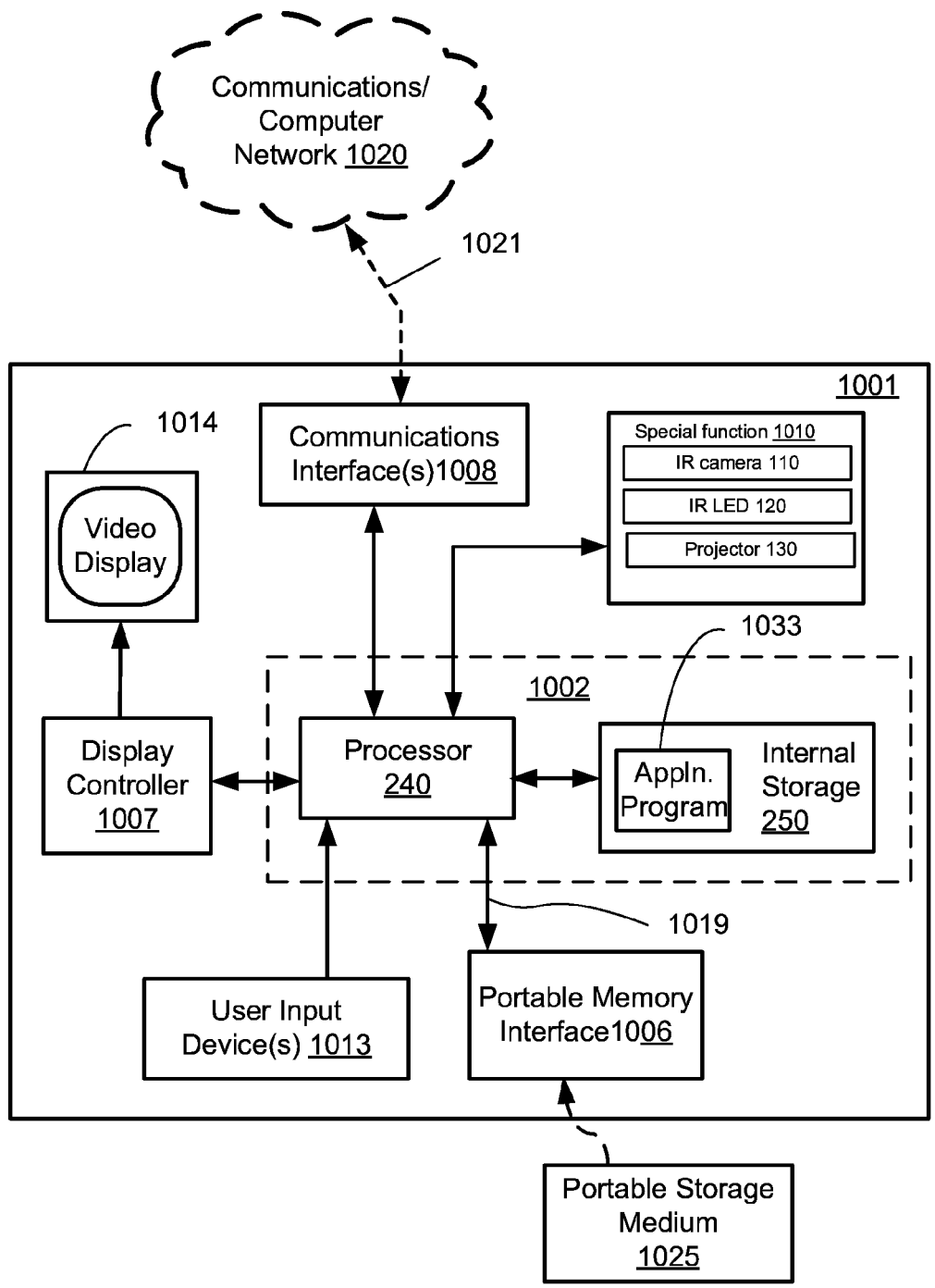
FIGS. 10A and 10B collectively form a schematic block diagram representation of an electronic device upon which described arrangements can be practised.
Figure 10B:
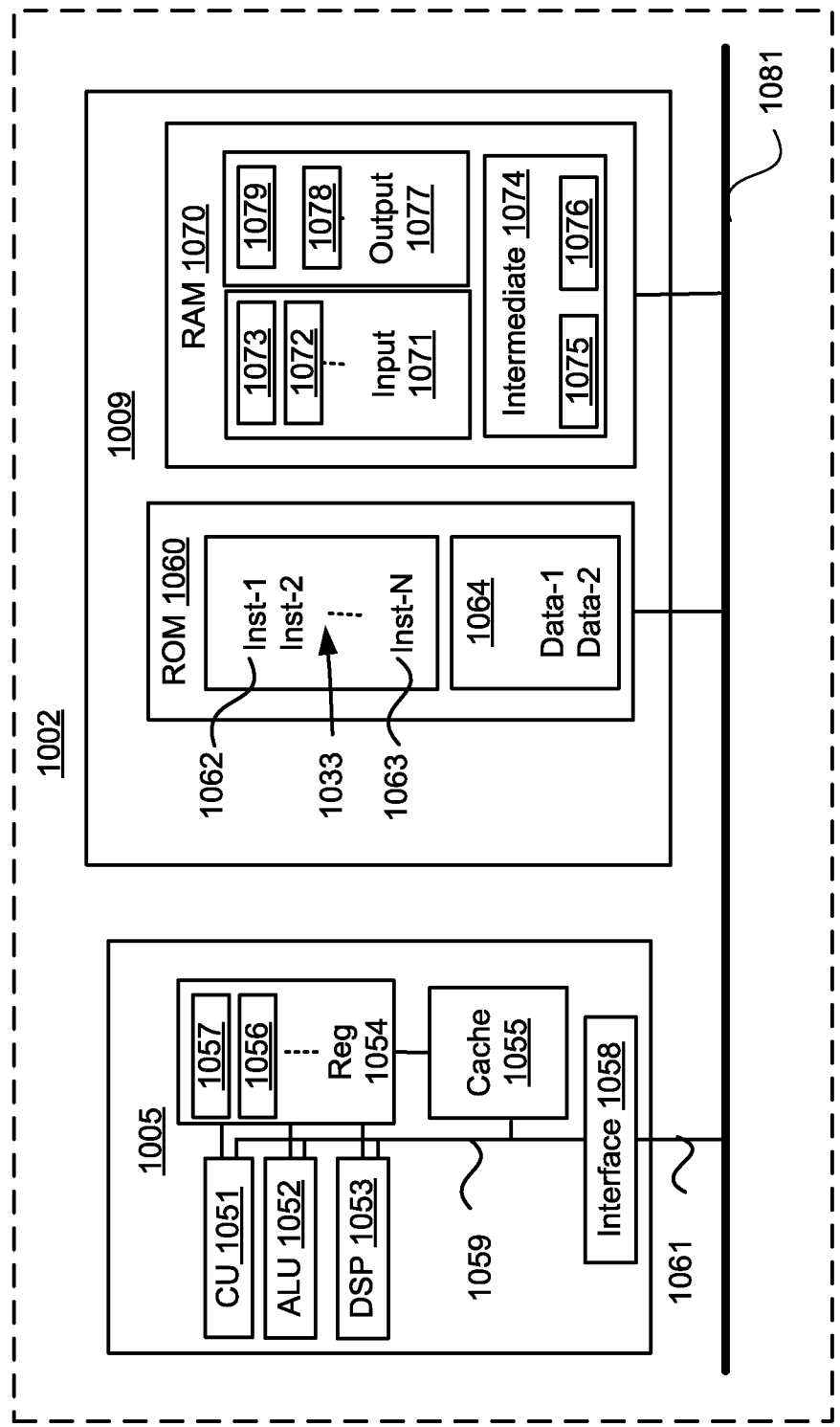

FIGS. 10A and 10B collectively form a schematic block diagram of a general purpose electronic device 1001 including embedded components, upon which the BBHD arrangements methods to be described are desirably practiced. The electronic device 1001 may be, for example, a mobile phone, a portable media player or a digital camera, in which processing resources are limited. Nevertheless, the methods to be described may also be performed on higher-level devices such as desktop computers, server computers, and other such devices with significantly larger processing resources.

As seen in FIG. 10A, the electronic device 1001 comprises an embedded controller 1002. Accordingly, the electronic device 1001 may be referred to as an "embedded device." In the present example, the controller 1002 has the processing unit (or processor) 240 which is bi-directionally coupled to the internal storage module 250. The storage module 250 may be formed from non-volatile semiconductor read only memory (ROM) 1060 and semiconductor random access memory (RAM) 1070, as seen in FIG. 10B. The RAM 1070 may be volatile, non-volatile or a combination of volatile and non-volatile memory.

The electronic device 1001 includes a display controller 1007, which is connected to a video display 1014, such as a liquid crystal display (LCD) panel or the like. The display controller 1007 is configured for displaying graphical images on the video display 1014 and/or the projected display 160 in accordance with instructions received from the embedded controller 1002, to which the display controller 1007 is connected.

The electronic device 1001 also includes user input devices 1013 which are typically formed by keys, a keypad or like controls to control operation of the device 1001. Alternately, the user can control the device by using his or her finger 150 to interact with the BBHD arrangement by means of display status and control information 102 which is projected by the projector 130 onto the surface 140 together with the interactive content. In some implementations, the user input devices 1013 may include a touch sensitive panel physically associated with the display 1014 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 10A, the electronic device 1001 also comprises a portable memory interface 1006, which is coupled to the processor 240 via a connection 1019. The portable memory interface 1006 allows a complementary portable memory device 1025 to be coupled to the electronic device 1001 to act as a source or destination of data or to supplement the internal storage module 250. Examples of such interfaces permit coupling with portable memory devices such as Universal Serial Bus (USB) memory devices, Secure Digital (SD) cards, Personal Computer Memory Card International Association (PCMCIA) cards, optical disks and magnetic disks.

The electronic device 1001 also has a communications interface 1008 to permit coupling of the device 1001 to a computer or communications network 1020 via a connection 1021. The connection 1021 may be wired or wireless. For example, the connection 1021 may be radio frequency or optical. An example of a wired connection includes Ethernet. Further, an example of wireless connection includes Bluetooth® type local interconnection, Wi-Fi (including protocols based on the standards of the IEEE 802.11 family), Infrared Data Association (IrDa) and the like.

Typically, the electronic device 1001 is configured to perform some special function. The embedded controller 1002, possibly in conjunction with further special function components 1010, is provided to perform that special function. For example, where the device 1001 is a digital camera, the components 1010 may represent a lens, focus control and image sensor of the camera. In the present BBHD arrangements, the special function components are the Infrared camera 110, the infrared LED 120, and the projector 130. The special function components 1010 is connected to the embedded controller 1002. As another example, the device 1001 may be a mobile telephone handset. In this instance, the components 1010 may represent those components required for communications in a cellular telephone environment. Where the device 1001 is a portable device, the special function components 1010 may represent a number of encoders and decoders of a type including Joint Photographic Experts Group (JPEG), (Moving Picture Experts Group) MPEG, MPEG-1 Audio Layer 3 (MP3), and the like.

The BBHD methods described hereinafter may be implemented using the embedded controller 1002, where the processes of FIGS. 8 to 9 may be implemented as one or more software application programs 1033 executable within the embedded controller 1002. The electronic device 1001 of FIG. 10A implements the described methods. In particular, with reference to FIG. 10B, the steps of the described methods are effected by instructions in the software 1033 that are carried out within the controller 1002. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The BBHD software 1033 of the embedded controller 1002 is typically stored in the non-volatile ROM 1060 of the internal storage module 250. The software 1033 stored in the ROM 1060 can be updated when required from a computer readable medium. The software 1033 can be loaded into and executed by the processor 240. In some instances, the processor 240 may execute software instructions that are located in RAM 1070. Software instructions may be loaded into the RAM 1070 by the processor 240 initiating a copy of one or more code modules from ROM 1060 into RAM 1070. Alternatively, the software instructions of one or more code modules may be pre-installed in a non-volatile region of RAM 1070 by a manufacturer. After one or more code modules have been located in RAM 1070, the processor 240 may execute software instructions of the one or more code modules.

The BBHD application program 1033 is typically pre-installed and stored in the ROM 1060 by a manufacturer, prior to distribution of the electronic device 1001. However, in some instances, the application programs 1033 may be supplied to the user encoded on one or more CD-ROM (not shown) and read via the portable memory interface 1006 of FIG. 10A prior to storage in the internal storage module 250 or in the portable memory 1025. In another alternative, the software application program 1033 may be read by the processor 240 from the network 1020, or loaded into the controller 1002 or the portable storage medium 1025 from other computer readable media. Computer readable storage media refers to any non-transitory tangible storage medium that participates in providing instructions and/or data to the controller 1002 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1001. Examples of transitory or non-tangible computer readable transmission media that may also participate in the provision of software, application programs, instructions and/or data to the device 1001 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1033 and the corresponding code modules mentioned above may be executed to implement one or more graphical user interfaces (GUIs) to be rendered or otherwise represented upon the display 1014 of FIG. 10A and/or the projected display 160. Through manipulation of the user input device 1013 (e.g., the keypad) and/or the projected display 160, a user of the device 1001 and the application programs 1033 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 10B illustrates in detail the embedded controller 1002 having the processor 240 for executing the application programs 1033 and the internal storage 250. The internal storage 250 comprises read only memory (ROM) 1060 and random access memory (RAM) 1070. The processor 240 is able to execute the application programs 1033 stored in one or both of the connected memories 1060 and 1070. When the electronic device 1001 is initially powered up, a system program resident in the ROM 1060 is executed. The application program 1033 permanently stored in the ROM 1060 is sometimes referred to as "firmware". Execution of the firmware by the processor 240 may fulfil various functions, including processor management, memory management, device management, storage management and user interface.

The processor 240 typically includes a number of functional modules including a control unit (CU) 1051, an arithmetic logic unit (ALU) 1052 and a local or internal memory comprising a set of registers 1054 which typically contain atomic data elements 1056, 1057, along with internal buffer or cache memory 1055. One or more internal buses 1059 interconnect these functional modules. The processor 240 typically also has one or more interfaces 1058 for communicating with external devices via system bus 1081, using a connection 1061.

The application program 1033 includes a sequence of instructions 1062 though 1063 that may include conditional branch and loop instructions. The program 1033 may also include data, which is used in execution of the program 1033. This data may be stored as part of the instruction or in a separate location 1064 within the ROM 1060 or RAM 1070.

In general, the processor 240 is given a set of instructions, which are executed therein. This set of instructions may be organised into blocks, which perform specific tasks or handle specific events that occur in the electronic device 1001. Typically, the application program 1033 waits for events and subsequently executes the block of code associated with that event. Events may be triggered in response to input from a user, via the user input devices 1013 of FIG. 10A and/or the projected display 160, as detected by the processor 240. Events may also be triggered in response to other sensors and interfaces in the electronic device 1001.

The execution of a set of the instructions may require numeric variables to be read and modified. Such numeric variables are stored in the RAM 1070. The disclosed method uses input variables 1071 that are stored in known locations 1072, 1073 in the memory 1070. The input variables 1071 are processed to produce output variables 1077 that are stored in known locations 1078, 1079 in the memory 1070. Intermediate variables 1074 may be stored in additional memory locations in locations 1075, 1076 of the memory 1070. Alternatively, some intermediate variables may only exist in the registers 1054 of the processor 240.

The execution of a sequence of instructions is achieved in the processor 240 by repeated application of a fetch-execute cycle. The control unit 1051 of the processor 240 maintains a register called the program counter, which contains the address in ROM 1060 or RAM 1070 of the next instruction to be executed. At the start of the fetch execute cycle, the contents of the memory address indexed by the program counter is loaded into the control unit 1051. The instruction thus loaded controls the subsequent operation of the processor 240, causing for example, data to be loaded from ROM memory 1060 into processor registers 1054, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1033, and is performed by repeated execution of a fetch-execute cycle in the processor 240 or similar programmatic operation of other independent processor blocks in the electronic device 1001.

Figure 8:
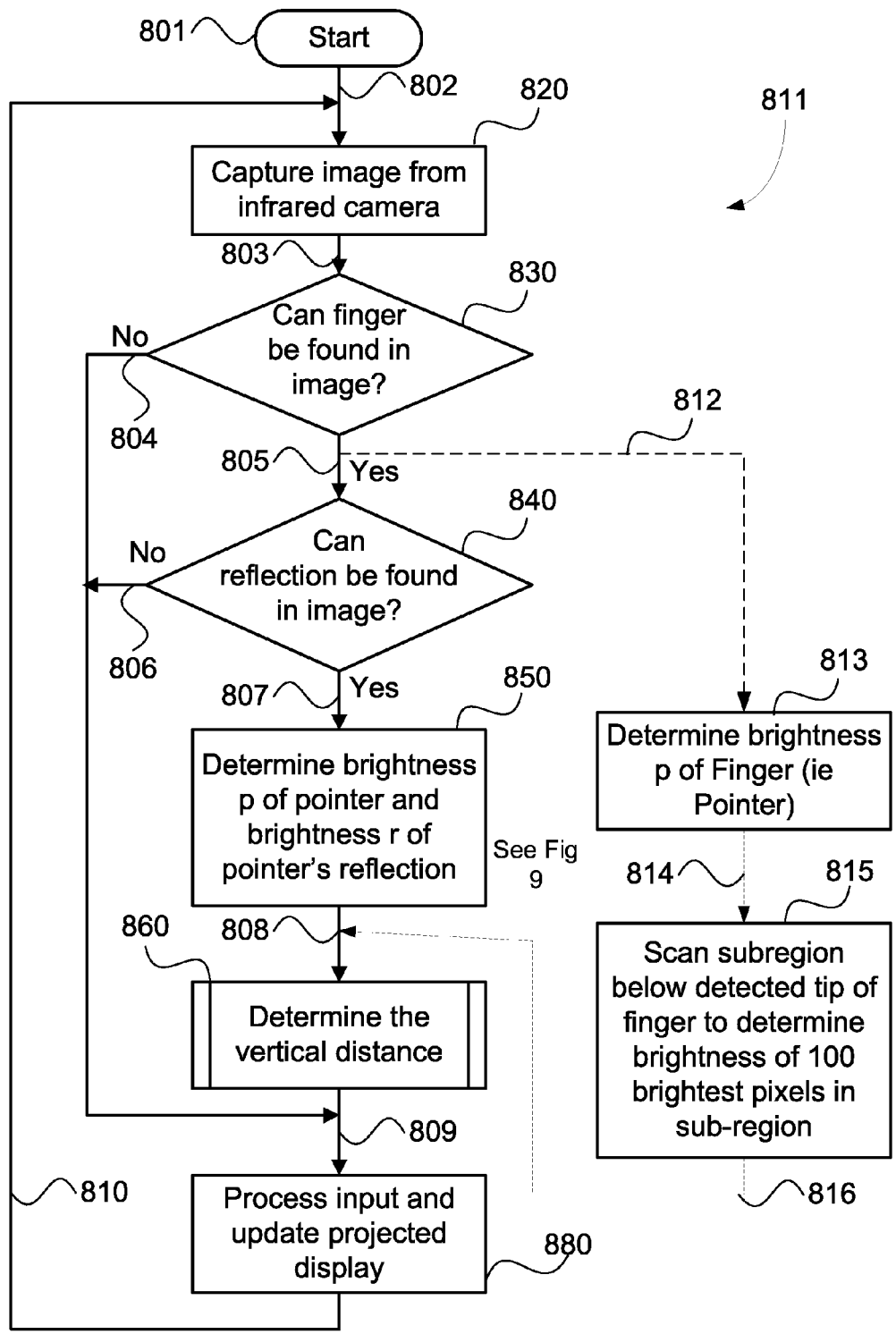
FIG. 8 is a flowchart depicting the process of the preferred BBHD arrangement.

FIG. 8 is a flowchart depicting process 811 which is one example of how the BBHD process can be performed. The processor 240 of the device 100 continuously receives and processes images captured by the infrared camera 110. The process 811 commences with a start step 801. Following an arrow 802, the processor 240 performs a step 820 in which an image is captured using the infrared camera 240 and stored in the memory storage 250. Following an arrow 803, the processor 240 attempts to detect the presence of an image 150' of the finger 150 (described hereinafter in more detail with reference to the Viola-Jones Object Detection Framework). If the image 150' is not detected, then following a NO arrow 804, the processor 240 continues processing in a step 880. Returning to the step 830, if the image 150' of the finger 150 is detected (ie is found to be present) then following a YES arrow 807, the processor 240 continues processing at a step 840. In the step 840, the processor 240 attempts to detect the presence of an image 420' of the reflection 420 of the finger 150 in the surface 140 (described hereinafter in more detail with reference to the Viola-Jones Object Detection Framework). If a reflection is not detected, then following a NO arrow 806, the processor 240 continues processing at the step 880. Returning to the step 840, if the image 420' of the reflection 420 is detected then following a YES arrow 807, the processor 240 continues processing at a step 850.

Detection of the presence of the image 150' of the finger 150 and the presence of the image 420' of the reflection 420 of the finger 150 in the steps 830 and 840 respectively can, in one BBHD arrangement, use a method known in the art as the Viola-Jones Object Detection Framework, published in "Robust real-time face detection", P. Viola and M. Jones, 2004. This method learns the visual characteristics of a class of objects (such as faces or fingers) from a set of example images of the class, and encodes the visual characteristics in a data structure. After learning is complete, the method can use the data structure to detect objects of the class in new (previously unseen) images or video.

The detection steps 830, 840 of the preferred BBHD arrangement use two respective data structures. The first data structure is, prior to performance of the process 830, learned from a large set of example images of a finger, such as the images depicted in FIGS. 5 and 7. The second data structure is, prior to performance of the process 840, learned from a large set of example images of a finger's reflection, such as the images depicted in FIGS. 5 and 7.

By means of the processes used in the steps 830, 840 the processor 240 of the device 100 is able to detect and distinguish both the finger and the finger reflections in the images received from the infrared camera 110.

The Viola-Jones Object Detection Framework has several attributes that make it suitable for use in the preferred BBHD arrangement. It is able to detect objects of the class that vary in size, overall brightness, or overall contrast. It is able to generalize well (for example, to differences in users' finger shapes). It is also able to process images in real time, creating a smooth interactive experience for the user.

Alternatively, the detection step 830 can use a method known in the art as template matching. According to this detection method, a template image (a normalized example image of a finger, previously calculated and stored in the memory of the device) is superimposed on the captured image at every possible pixel position. At each pixel position, the pixels of the captured image that are overlaid by the template are themselves normalized and then the sum of absolute differences (SAD) between the pixels of the template and the corresponding normalized pixels of the captured image is calculated. The more the pixels of the template differ from the pixels of the captured image at the given pixel position, the greater the SAD will be. The pixel position having the minimum SAD (ie, the greatest similarity to the template) is deemed to be the position of the finger in the captured image. If the minimum SAD is greater than a threshold value (ie, sufficiently dissimilar to the template), the finger is deemed to be absent. Here, normalization refers to adjusting pixel values to use the entire available dynamic range, which assists in detecting fingers that vary in brightness or contrast. In order to detect fingers at various distances from the camera, it is necessary to repeat the detection process with multiple templates of varying sizes. The detection step 840 is similarly performed using another set of multiple templates representing reflections.

Other algorithms with suitable attributes can however also be used with the BBHD arrangement.

At a step 850, after the processor 240 has detected the presence of the image 150' of the finger 150 and the presence of the image 420' of its reflection 420 in the respective steps 830, 840, following an arrow 807 from the step 840, the processor 240 determines the value of a brightness parameter p for the image 150' of the finger 150 (also referred to as the finger brightness) and the value of a brightness parameter r for the image 420' of the reflection 420 of the finger (also referred to as the reflection brightness) as follows.

The finger brightness p is defined as the sum of the intensity of a predetermined number of the brightest pixels, such as for example the 100 brightest pixels (such as a pixel 501) among those image pixels in the image 150' corresponding to the finger (ie the pointer) 150. The intensity of each pixel may be represented as a value between 0 and 255. The aforementioned pixels need not be contiguous, and in fact their exact locations are not important. The aforementioned pixels merely establish a brightness for the finger.

The reflection brightness r is similarly defined as the sum of the intensity of a predetermined number of the brightest pixels, such as for example the 100 brightest pixels (such as a pixel 502) among those image pixels in the image 420' of the reflection 420 of the finger 150. The intensity of each pixel may be represented as a value between 0 and 255.

As will be seen below, the units of values p and r are not relevant, however their ratio is important. A value of zero for either p or r indicates the complete absence of infrared light, with increasing values representing increasing levels of infrared light. While the values of pixel intensities has been described above as being measured between 0 and 255, any unit may be used as long as the units of p and r are the same.

After step 850, following an arrow 808, the processor 240 continues processing at a step 860 where a vertical distance of the finger 150 above the surface 140 is determined by the processor 240. Following an arrow 809, the processor 240 continues processing at a step 880. At the step 880, the determined vertical distance of the finger is used by the processor 240 to update the appearance of graphical user interface 160. For example, the processor 240 may change the size, color, or transparency of an element of the graphical user interface 160 in direct proportion to the determined vertical distance. The updated appearance of the graphical user interface 160 is projected by projector 130 on to surface 140. After the step 880, following an arrow 810, the processor returns to the step 820.

Figure 5:
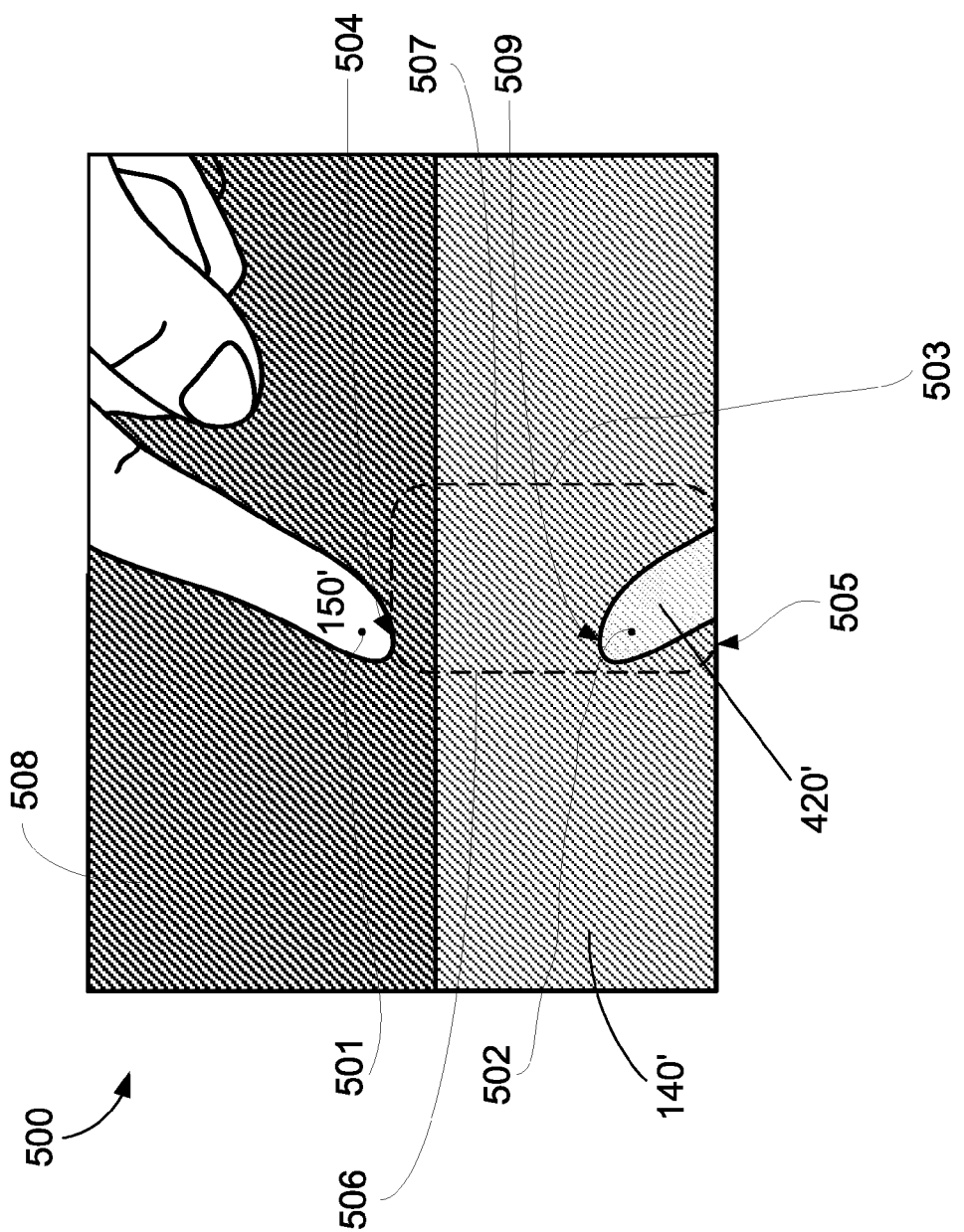
FIG. 5 is an image captured by the camera in the configuration shown in FIG. 4.

In an alternative implementation of the steps 830 and 840, a Viola-Jones Object Detection Framework detector is used which uses only a single data structure capable of detecting the image 150' of the finger 150 and not the image 420' of the finger reflection 420. The single data structure is learned from a large set of example images 150' (such as shown in FIG. 5) of a finger 150. Once the processor 240 has detected the presence of the image 150' of the finger 150 in the step 830, the process follows an alternate dashed line 812 and in a step 813 the processor 240 determines the finger brightness alone using the brightest 100 pixels such as the pixel 501 in the image 150' of the finger 150. The brightest 100 pixels may be selected from pixels in a 50 by 50 pixel window, centered on the finger-tip. Such a window size would be suitable for an image captured with a resolution of 640 by 480 pixels. The aforementioned pixels establish a brightness for the finger, and there is no condition that the pixels be contiguous.

Following a dashed arrow 814 in this alternative, in a step 815 the processor 240 scans a subregion, depicted by a dashed generally rectangular shape 503, of the image below the detected image 150' of the finger 150. The top of the subregion 503 starts below a position 504 of the detected image of the finger-tip and extends towards the bottom of the image. The bottom of the subregion 503 corresponds to a bottom 505 of the image. A left edge 506 and a right edge 507 of the subregion 503 align to the left and the right edges of the detected image 150' of the finger within the captured image 500. Using this alternative method, in the step 815 the reflection brightness is defined as the sum of the 100 brightest pixels, such as 502, among image pixels inside the subregion 503. The process then follows a dashed arrow 816 back to the step 860.

In the disclosed BBHD arrangement, the reflection brightness increases as the finger 150 gets closer to the surface 140. The reflection brightness decreases as the finger 150 gets further away from the surface 140. Reflection brightness reaches a maximum when the finger 150 is touching the surface 140. This is now explained in more detail with reference to FIGS. 3-7.

Figure 3:
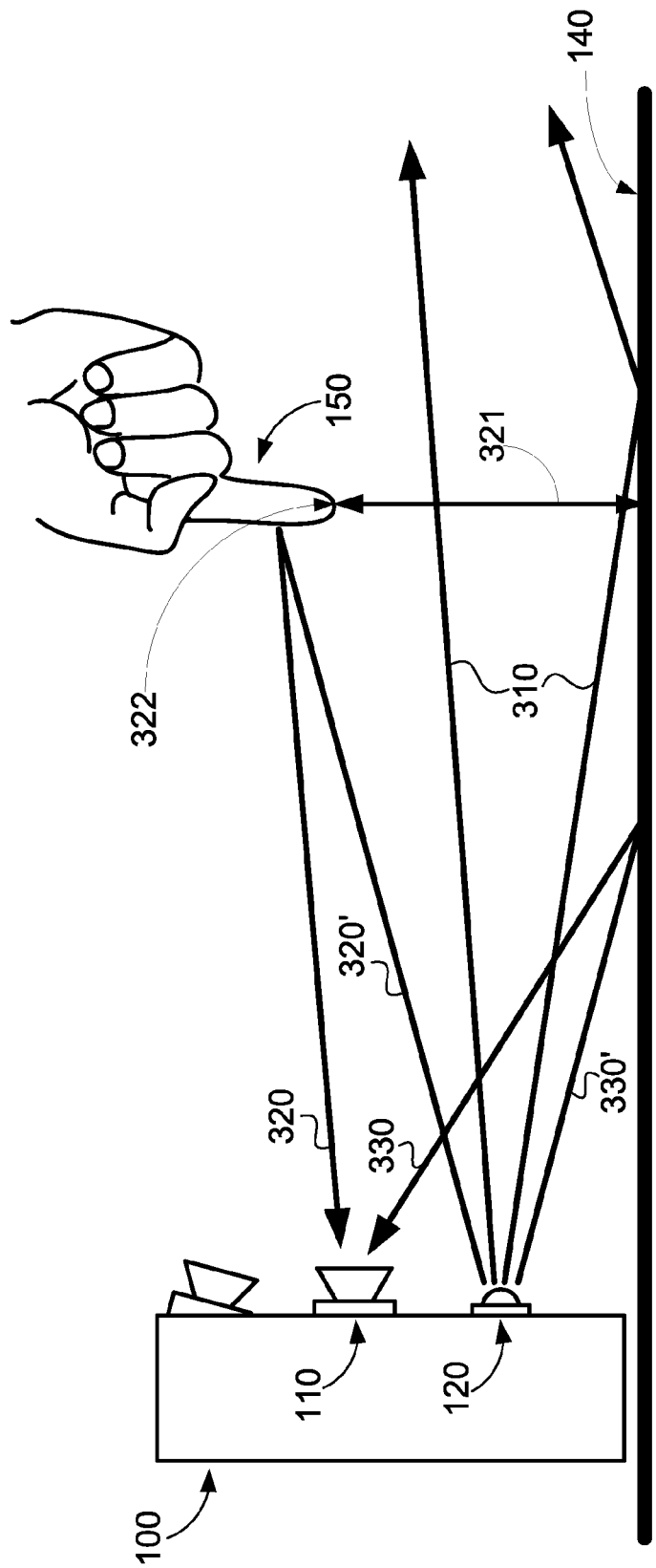
FIG. 3 is a side view of the preferred BBHD arrangement in a first state.

FIG. 3 shows a side view of the preferred BBHD arrangement, wherein the finger 150 is high above the surface, for example, approximately 150 mm above the surface. The device 100 is resting on the surface 140. The light source 120 emits infrared light rays. Light rays 310 leave the system without entering the infrared camera 110. Light rays 320 are reflected by the finger 150 before being detected by the infrared camera 110. Light rays 330 are reflected by the surface 140 before being detected by the infrared camera 110.

Figure 4:
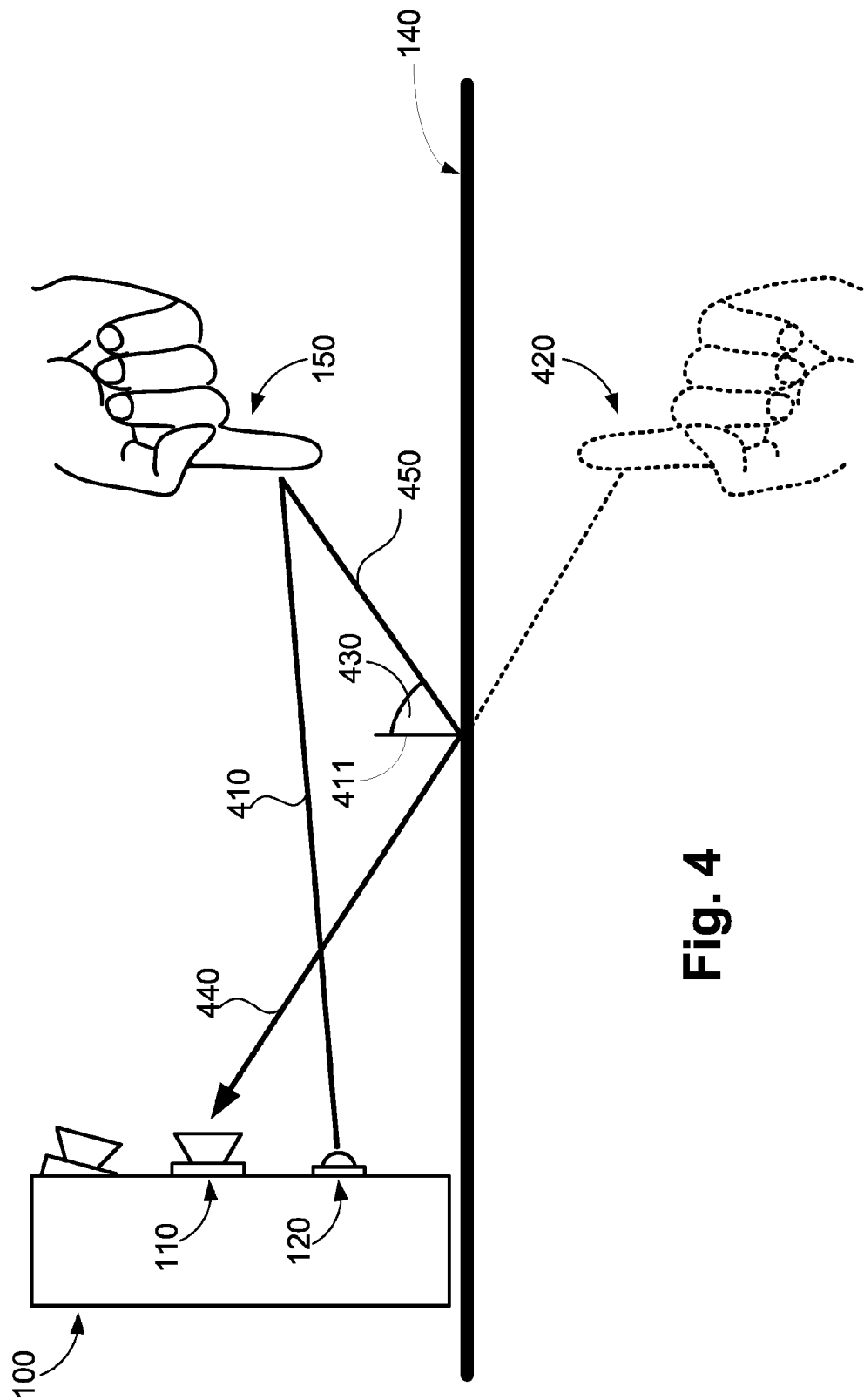
FIG. 4 is a side view of the preferred BBHD arrangement in a second state.

FIG. 4 shows how the reflection 420 of the finger 150 is formed in the surface 140. The finger 150 is near the surface 140 but not touching the surface 140, for example, approximately 30 mm above the surface. In addition to the light rays depicted in FIG. 3, a light ray 410 emitted from the light source 120 is reflected by the finger 150 to form a ray 450 which is directed towards the surface 140. In particular, the reflected light ray 450 reaches the surface and reflect to form a ray 440 which is directed towards the infrared camera 110. The light ray 440 that is detected by the camera 110 forms (part of) the reflection 420 of the finger 150 in the surface 140. In FIG. 4, the reflection 420 has sharp edges forming the distinct shape of an inverted finger 150. This is because surface 140 is somewhat shiny and reflects the light ray 450 in a specular manner, where the surface has a reflective finish that is between smooth and matte. An example of such a surface would be for the surface of a plastic table or a polished wooden table. As such, the reflection 420 resembles an inverted finger 150. Surfaces that are not very shiny will reflect light more diffusely. For diffusely reflecting surfaces, the reflection 420 will appear as an irregular light blob that does not clearly resemble an inverted finger 150.

An angle of incidence 430 between the incident light ray 450 and a normal 411 to the surface 140 is approximately 45° which is substantially less than 90°. Consequently, as described hereinafter in regard to FIG. 11, the reflection 420 is weak (having a low brightness of about 2%).

Figure 6:
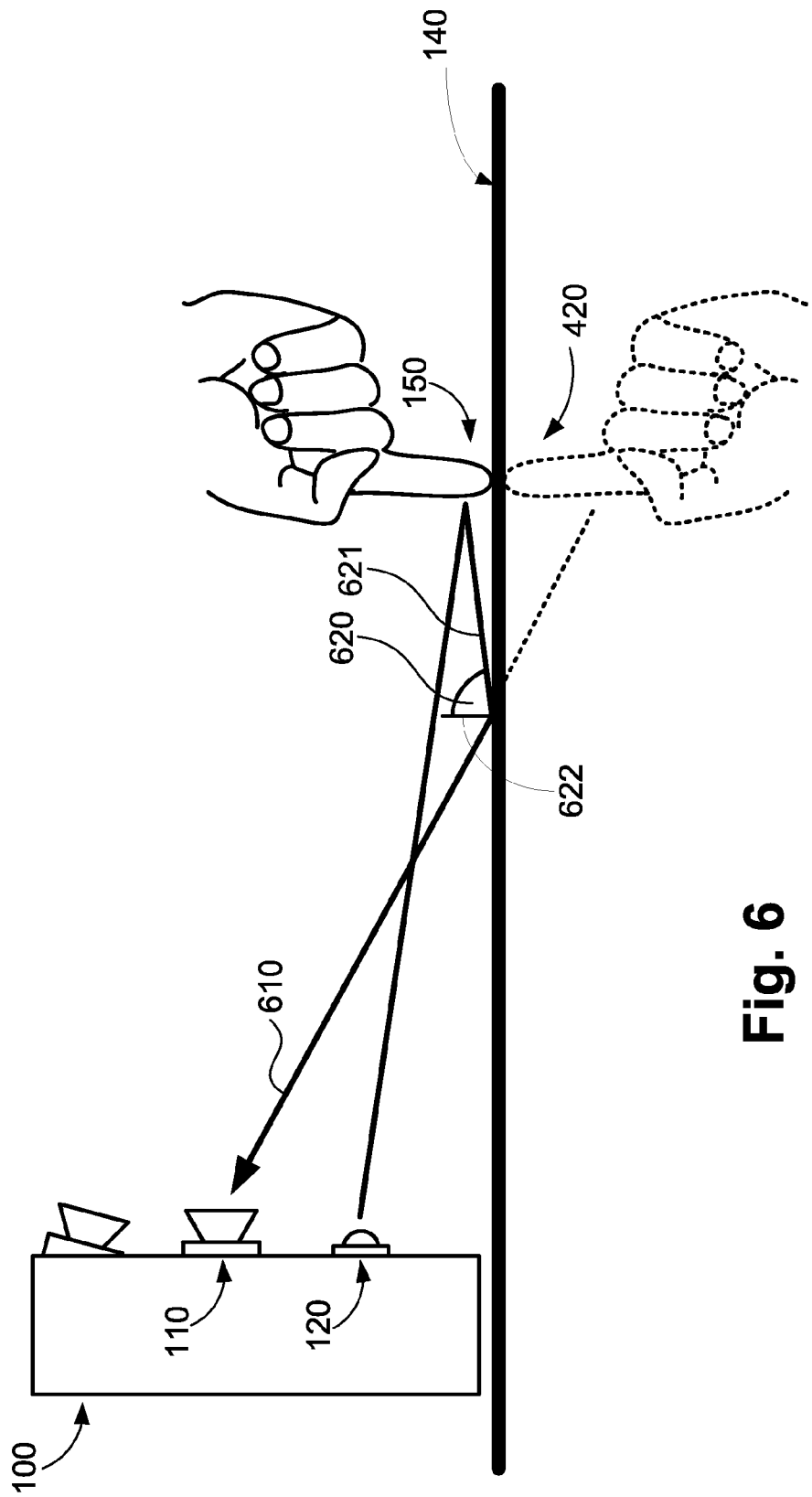
FIG. 6 is a side view of the preferred BBHD arrangement in a third state.
Figure 11:
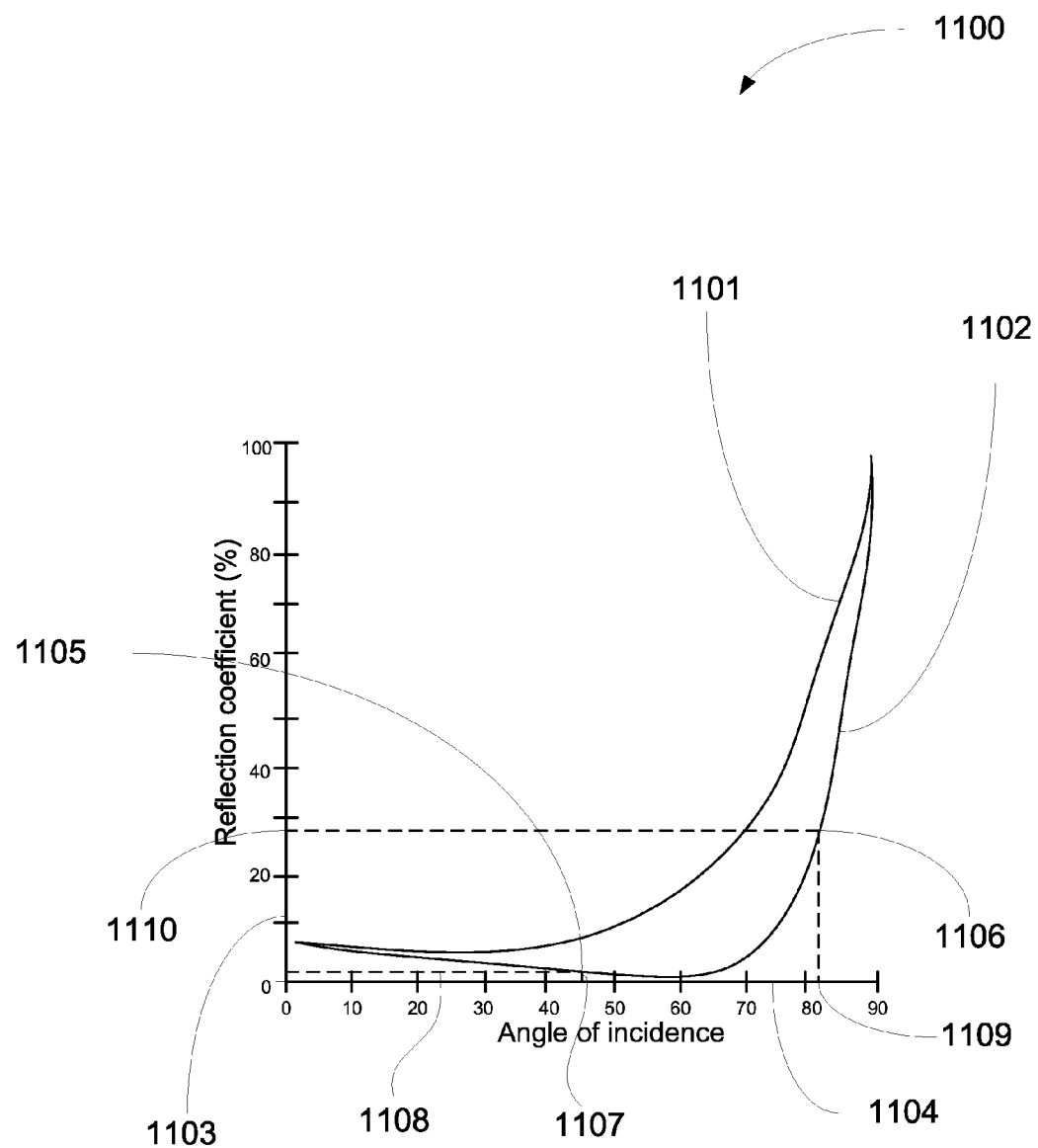
FIG. 11 depicts relative brightness of a pointer and it's reflection as a function of the angle of incidence of their associated light rays to a reflective surface.

FIG. 11 is a graphical depiction 1100 of the relationship between (a) relative brightness 1101 of a pointer and relative brightness 1102 of a reflection of the pointer, and (b) an angle of incidence of their associated light rays to a reflective surface. The angle of incidence of a light ray to the normal of a surface, for example as depicted by 430 in FIGS. 4 and 620 in FIG. 6, is plotted along a horizontal axis 1104. Relative brightness is plotted along a vertical axis 1103. Relative brightness of the image 150' of the finger 150 as the angle of incidence 430 varies from 0 degrees to 90 degrees is depicted by a curve 1101. Relative brightness of the image 420' of the reflection 420 as the angle of incidence 430 varies from 0 degrees to 90 degrees is depicted by a curve 1102. The angle 430 in FIG. 4 is approximately 45° (see 1105), and this results in a relative brightness of about 2% (see dashed lines 1107, 1108). The angle 620 in FIG. 6 is approximately 82° (see 1106), and this results in a relative brightness of about 24% (see dashed lines 1109, 1110).

FIG. 5 shows an image 500 captured by the infrared camera 110 in the BBHD arrangement shown in FIG. 4. The image 150' of the finger 150 is formed by light rays 320. The image 140' of the surface 140 is formed by light rays 330. The reflection 420 is formed by light rays 410. The image 420' of the reflection 420 is weak, because the angle of incidence 430 is much less than 90°, as is apparent from the graph in FIG. 11. The rest 508 of the image 500 is black, because no light from the light source 120 has reached the sensor of the infrared camera 110.

FIG. 6 shows a side view of the preferred BBHD arrangement when the finger 150 is touching the surface 140. Similarly to FIG. 4, some light rays 610 are reflected by the finger 150 onto the surface 140 before being directed to and detected by the infrared camera 110, these rays forming the image 420' of the reflection 420. As described earlier, the reflection 420 resembles an inverted finger 150 because the surface 140 is somewhat shiny. For surfaces that are not very shiny, the reflection 420 will appear as an irregular light blob that does not clearly resemble an inverted finger 150.

An angle of incidence 620 of a light ray 621 reflecting off the finger 150 and towards the surface 140 is closer to 90°, being approximately 82°. Comparing FIG. 4 and FIG. 6, the angle of incidence 620 in FIG. 6 when the finger 150 is touching the surface 140 is larger than the angle of incidence 430 in FIG. 4 when the finger 150 is not touching the surface 140. Accordingly, the image 420' of the reflection 420 is relatively strong (having a relatively high brightness of about 24%) in FIG. 6, as depicted by the graph in FIG. 11.

Figure 7:
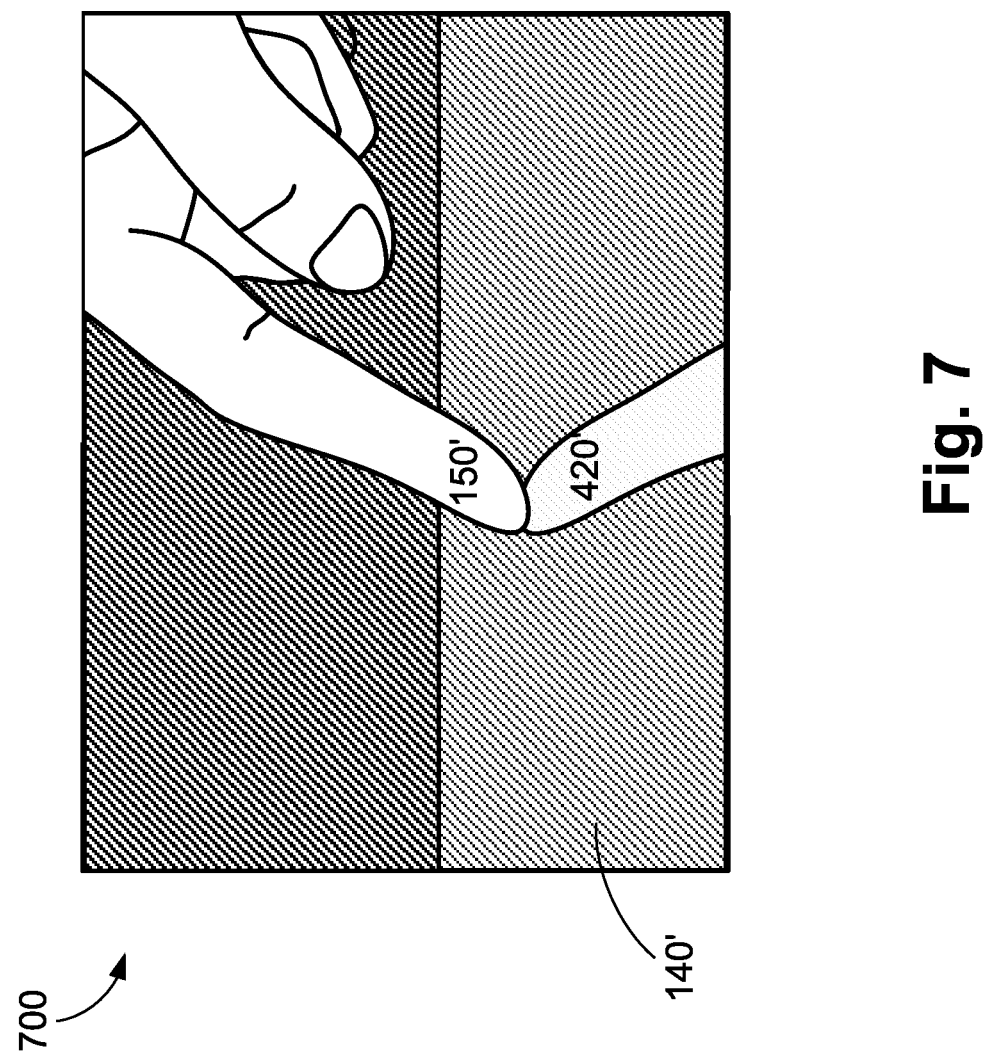
FIG. 7 is an image captured by the camera in the configuration shown in FIG. 6.

FIG. 7 shows an image 700 captured by the infrared camera 110 in the BBHD arrangement shown in FIG. 6. The image 700 is similar to the image 500, showing the image 150' of the finger 150, the image 140' of the surface 140, and the image 420' of the reflection 420. However, the image 402' of the reflection 420 is much brighter in FIG. 7 than in FIG. 5, because the large angle of incidence 620 results in a stronger reflection.

Reflection brightness is thus correlated to a distance 321 between the finger 150 and the surface 140, the distance 321 being referred to as a vertical distance, which is associated with a parameter "d". The vertical distance d (ie 321) is calculated by the processor 240 at the step 860 in the process 811 in FIG. 8.

Figure 9:
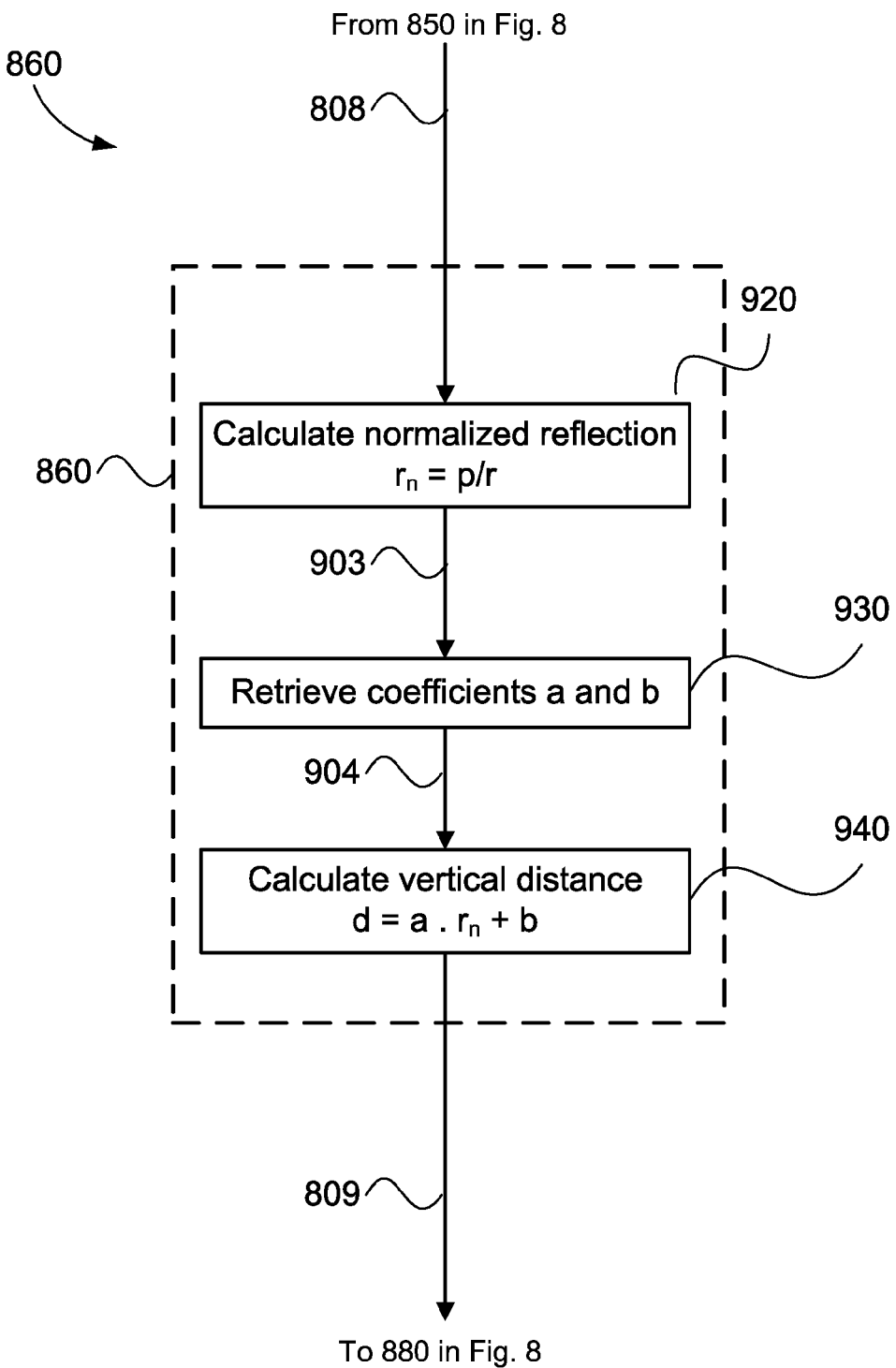
FIG. 9 is a flowchart depicting the details of step 860.

FIG. 9 is a flow chart showing one example 900 of how the step 860 in FIG. 8 can be implemented. If the reflection brightness r was purely a monotonic function of the vertical distance d, the processor 240 could calculate vertical distance d from the reflection brightness r using the inverse of the monotonic function. However, reflection brightness r is also dependent upon finger brightness p, and finger brightness p in turn is dependent upon several other factors, including a distance between the finger 150 and the infrared light source 120, a response curve of the image sensor in the infrared camera 110, variations in the infrared light source 120, variations in the reflectivity of the surface 140 and finger 150, and the presence of ambient infrared light. Accordingly, at a step 920 in the process 900, the processor 240 divides the reflection brightness r by the finger brightness p, thereby substantially cancelling out the effect of the aforementioned factors, to thereby form a normalized reflection brightness $r_n$, which is, to a first order of approximation, dependent upon the vertical distance d alone. The normalized reflection brightness $r_n$ is thus determined as follows:

$$r_n = \frac{p}{r}$$

This BBHD arrangement thus determines the vertical distance d using a linear model of the normalized reflection brightness $r_n$. This linear model is expressed as follows:

$$d = a \cdot r_n + b$$

where a and b are predetermined coefficients, described hereinafter in more detail below.

Returning to FIG. 9, following an arrow 903, in a step 930 the processor 240 retrieves the coefficients a and b from the memory storage 250. Following an arrow 904, in a step 940 the processor 240 determines the vertical distance d (depicted as 321 in FIG. 3) of the finger 150 using the normalized reflection brightness $r_n$ and coefficients a and b according to the following linear model:

$$d = a \cdot r_n + b$$

Where the coefficients a and b are determined by fitting the above linear model to a number of data points of the form:

[normalized reflection brightness, vertical distance]

These data points are acquired by sampling, during a calibration process of the device 100, described hereinafter in more detail with reference to FIG. 12, wherein the finger 150 is held in several positions at several known vertical distances, while the processor 240 calculates normalized reflection brightness using the method described above. The vertical distance can be measured by placing a ruler on the surface and reading the ruler to determine the vertical distance to the bottom of the finger. The device 100 guides the user through the calibration process, according to a process such as that depicted in FIG. 12, for example, using a combination of textual instructions and calibration markings displayed on the projected display 160, until enough data points have been collected for curve fitting of suitable accuracy. The collected data points are stored in the memory storage 250.

Figure 12:
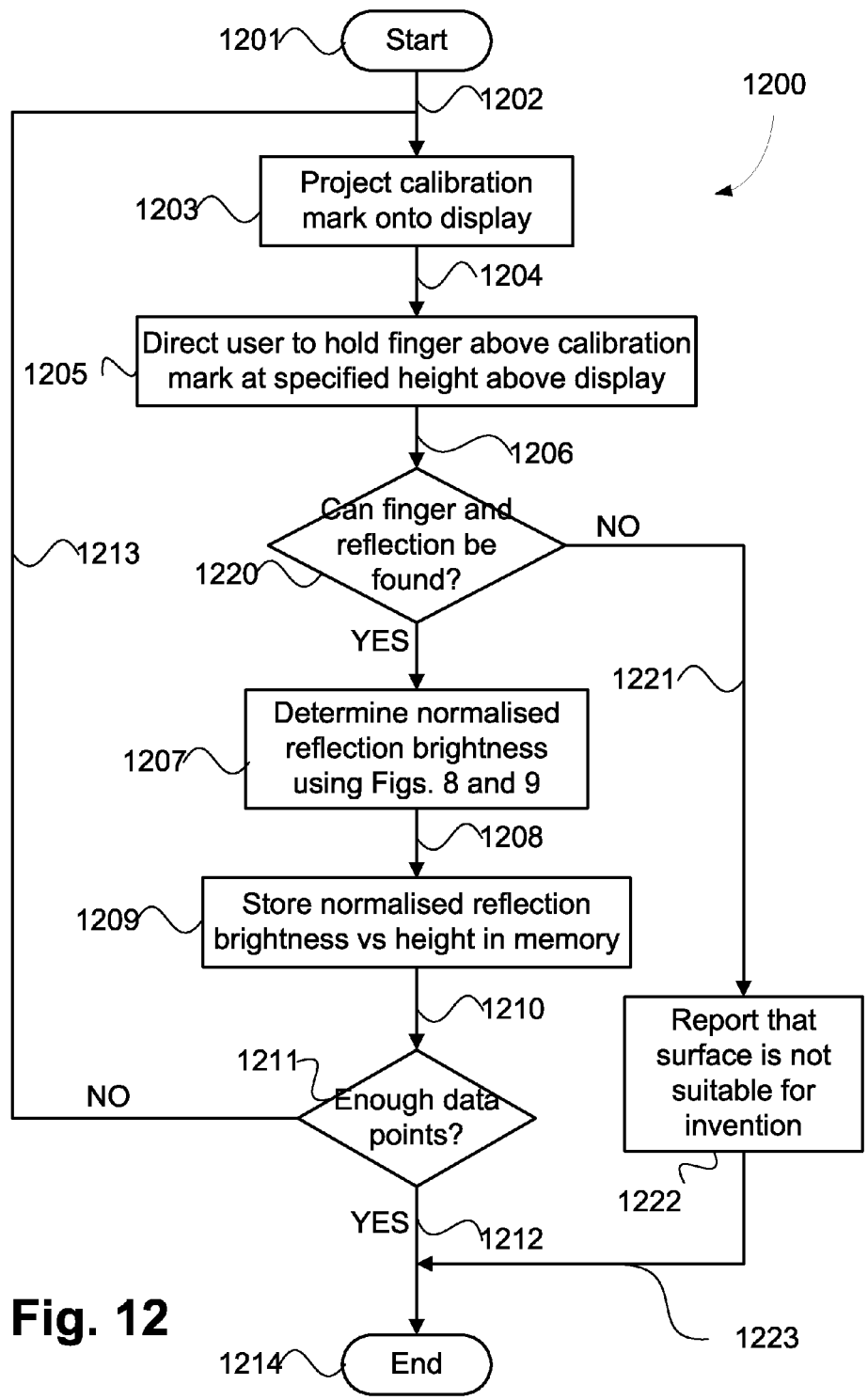
FIG. 12 is a flow chart showing one example of how the BBHD arrangement can be calibrated.

FIG. 12 is a flow chart showing one example of how the BBHD arrangement can be calibrated. The process 1200 commences with a start step 1201. Following an arrow 1202, in a step 1203 the processor 240 directs the projector 130 to project a calibration mark such as 103 (see FIG. 1) onto the projected display 160. Following an arrow 1204, in a step 1205 the processor 240 directs the user to hold his or her finger above the projected mark 103 at a specified vertical distance d, above the display 160. Following an arrow 1206, in a step 1220 the processor 240 determines whether the finger and reflection can be found in the image, using the same detector described in steps 830, 840. If the finger and reflection cannot be found, then following an arrow 1221, in a step 1222 the processor 240 reports to the user that the reflective characteristics of the surface 140 mean the surface is unsuitable to practice the invention, and following an arrow 1223, calibration process 1200 ends at step 1214.

Figure 13:
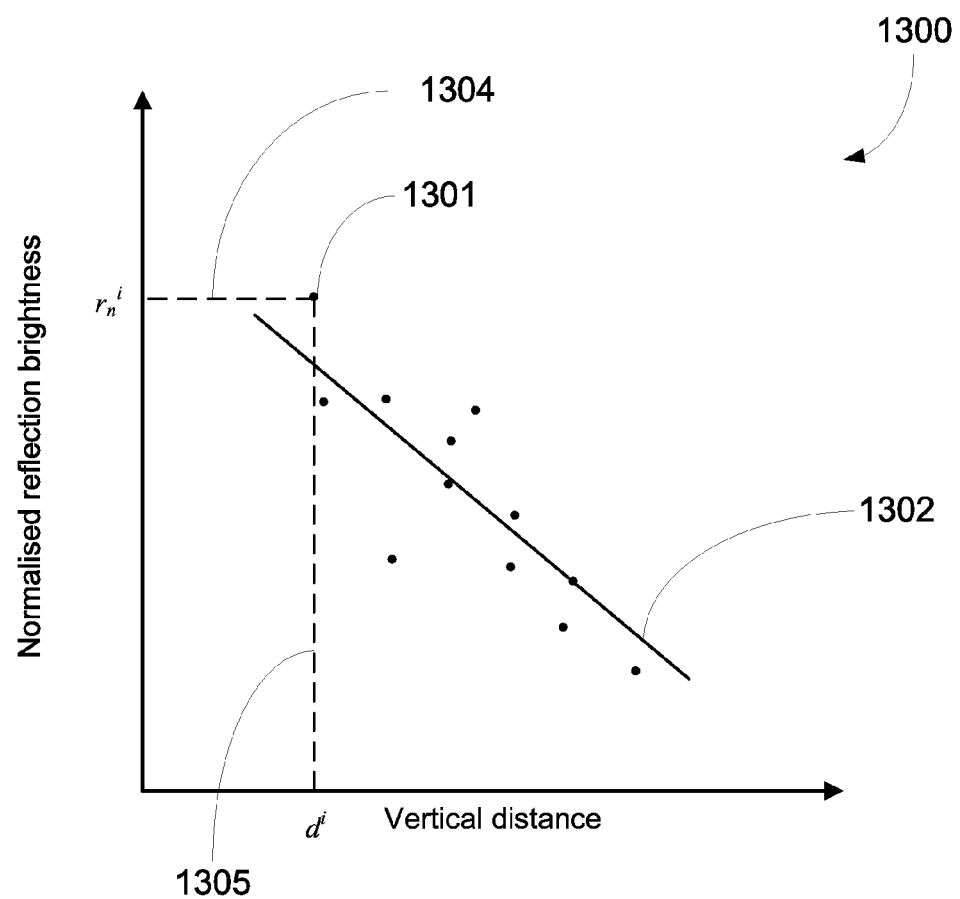
FIG. 13 illustrates one relationship between normalized reflection brightness vs vertical distance.

However, if at the step 1220 the finger and reflection can be found, then following a YES arrow, in a step 1207 the processor 240 determines a normalized reflection coefficient (also referred to as the normalized reflection brightness) $r_n$ for the specified coordinate at which the calibration 103 is located and for the specified vertical height $d_i$. A normalized reflection brightness $r_n{}^i$ and the associated height $d^i$ (having respective reference numerals 1305, 1306) constitute coordinates for a data point 1301 in FIG. 13. Returning to FIG. 12, following an arrow 1208, in a step 1209 the normalized reflection brightness $r_n{}^i$ and the associated height $d^i$ are stored in the memory storage 250. Following an arrow 1210, in a step 1211 the processor 240 determines whether enough data points have been stored—the processor may for example store a fixed number of data points. If there are not enough data points stored then following a NO arrow 1213 the calibration process 1200 returns to step the 1203. Otherwise following an arrow 1212 the process 1200 ends at a step 1214.

A straight line such as 1302 can be fitted to the data points in FIG. 11, using a least squares method, for example, if a linear model is to be adopted for the relationship of normalized reflection brightness $r_n$ vs vertical distance d.

In some cases, due to the many variable factors in both the manufacture of the device 100 and its operating environment, normalized reflection brightness may not be a monotonic function of vertical distance. That is to say, that the same normalized reflection brightness can be determined at several different vertical distances. In particular, this can occur when the distance between the finger 150 and the infrared light source 120 changes. In an alternative BBHD arrangement intended for such cases, the processor 240 does not divide reflection brightness by finger brightness, but instead proceeds on the basis that the vertical distance is a function of both the finger brightness and reflection brightness, defined as follows:

vertical distance=g(finger brightness, reflection brightness)

The function g is unknown, so in this BBHD arrangement the processor 240 approximates the function g by fitting a polynomial curve to a number of data points of the form:

[finger brightness, reflection brightness, vertical distance]

In this BBHD arrangement, accuracy can be increased at the cost of additional complexity.

In some cases, where the surface 140 is diffuse, light rays 330 reflected diffusely by the surface 140 may influence the measured reflection brightness. This can cause the processor 240 to calculate vertical distance inaccurately. In another alternative BBHD arrangement intended to address this problem, a technique known in the art as background subtraction can be used to increase accuracy by excluding light reflected diffusely by the surface 140. With this technique, the infrared camera 110 captures an image (the background image) when the finger 150 is not present. The background image is formed by light rays 330 that are emitted by the light source 120, reflected off the surface 140 and, finally, arrive at the camera 110. The background image also captures any ambient infrared light that may exist within the operating environment. The background image is stored in the memory storage 250. Before the processor 240 determines the reflection brightness, the camera's current image is modified by subtracting the values of pixels in the background image from corresponding values of pixels in the camera's current image. Processing then proceeds by determining reflection brightness using the modified camera image, thus resulting in a more accurate reflection brightness measurement.

INDUSTRIAL APPLICABILITY

The arrangements described are applicable to the computer and data processing industries and particularly for the computer vision industry.

The foregoing describes only some embodiments of the present invention, and modifications and/or changes can be made thereto without departing from the scope and spirit of the invention, the embodiments being illustrative and not restrictive.

The invention claimed is:

1. A method for determining a distance from a tip of a pointer to a surface using a light source and a single camera, the method comprising:
   detecting in an image captured by the camera a tip of the pointer;
   determining in the image captured by the camera an intensity of a set of pixels below the tip of the pointer, the intensity defining a reflection by the surface of the tip of the pointer illuminated by the light source; and
   determining the distance from the tip of the pointer to the surface depending upon the intensity of the set of pixels below the tip of the pointer and an intensity of pixels of the tip of the pointer in the image.

2. A method according to claim 1 wherein the intensity of the set of pixels below the tip of the pointer is dependent upon an angle of incidence of light reflected from the pointer to the surface.

3. The method according to claim 2 wherein the intensity of the set of pixels below the tip of the pointer varies according to the angle of incidence.

4. A method for determining a distance from a tip of a pointer to a surface using a light source and a single camera, the method comprising the steps of:
   illuminating the pointer and the surface by the light source;
   capturing an image by the camera;
   detecting in the image the tip of the pointer;
   determining in the image an intensity of a set of pixels below the tip of the pointer;
   determining the distance from the tip of the pointer to the surface dependent upon the intensity of the set of pixels below the tip of the pointer, and an intensity of pixels of the tip of the pointer.

5. A method according to claim 1, wherein the step of detecting in the image a tip of the pointer comprises determining a sum of the intensities of a predetermined number of brightest pixels in the image of the pointer.

6. A method according to claim 1, wherein the step of determining in the image the intensity of the set of pixels below the tip of the pointer comprises determining a sum of the intensities of a predetermined number of brightest pixels in an image of a reflection of the pointer.

7. A method according to claim 1, wherein the step of determining in the image the intensity of the set of pixels below the tip of the pointer comprises determining a sum of the intensities of a predetermined number of brightest pixels in a subregion of the image extending below the detected tip of the pointer to a bottom of the image below the pointer, said subregion having a width approximately equal to a width of the image of the pointer.

8. A method according to claim 1, wherein the step of determining the distance from the tip of the pointer to the surface comprises a step of dividing the intensity of the set of pixels below the tip of the pointer by the intensity of pixels of the tip of the pointer.

9. A method according to claim 1, wherein the step of determining the distance from the tip of the pointer to the surface comprises a step of subtracting values of pixels in a background image from corresponding values of pixels in the image.

10. An apparatus for determining a distance from a tip of a pointer to a surface, the apparatus comprising:

a light source;

a single camera;

a processor configured to communicate with the light source and the camera; and a memory storing a computer executable software program configured to direct the processor to execute a method comprising the steps of:

detecting in an image captured by the camera a tip of the pointer;

determining in the image captured by the camera an intensity of a set of pixels below the tip of the pointer, the intensity defining a reflection by the surface of the tip of the pointer illuminated by the light source; and determining the distance from the tip of the pointer to the surface depending upon the intensity of the set of pixels below the tip of the pointer and an intensity of pixels of the tip of the pointer in the image.

11. A non-transitory computer readable storage medium storing a computer executable software program configured to direct a processor to execute a method for determining a distance from a tip of a pointer to a surface, the method comprising the steps of:

detecting in an image captured by a camera a tip of the pointer;

determining in the image captured by the camera an intensity of a set of pixels below the tip of the pointer, the intensity defining a reflection by the surface of the tip of the pointer illuminated by the light source; and determining the distance from the tip of the pointer to the surface depending upon the intensity of the set of pixels below the tip of the pointer and an intensity of pixels of the tip of the pointer in the image.

* * * * *